US012607230B2

(12) United States Patent
Furuya et al.

(10) Patent No.: US 12,607,230 B2
(45) Date of Patent: Apr. 21, 2026

(54) ELECTROLYTIC CORROSION PREVENTION MEMBER FOR ROLLING BEARING AND ELECTROLYTIC CORROSION PREVENTION ROLLING BEARING UNIT

(71) Applicant: NSK-WARNER K.K., Tokyo (JP)

(72) Inventors: Masatomo Furuya, Shizuoka (JP);
Mutsumi Setoi, Shizuoka (JP);
Fumimasa Muramatsu, Shizuoka (JP)

(73) Assignee: NSK-WARNER K.K., Tokyo (JP)

( * ) Notice: Subject to any disclaimer, the term of this patent is extended or adjusted under 35 U.S.C. 154(b) by 71 days.

(21) Appl. No.: 18/746,941

(22) Filed: Jun. 18, 2024

(65) Prior Publication Data

US 2025/0129821 A1    Apr. 24, 2025

(30) Foreign Application Priority Data

Oct. 20, 2023    (JP) ................................. 2023-180999
Feb. 28, 2024    (JP) ................................. 2024-028494

(51) Int. Cl.
*F16C 19/06*      (2006.01)
*F16C 19/52*      (2006.01)
*F16C 41/00*      (2006.01)

(52) U.S. Cl.
CPC ............ *F16C 41/002* (2013.01); *F16C 19/06* (2013.01); *F16C 19/52* (2013.01)

(58) Field of Classification Search
CPC ........ F16C 19/06; F16C 19/52; F16C 41/002; F16C 35/04; F16C 35/063; F16C 35/067; F16C 35/073; F16C 35/077
See application file for complete search history.

(56) References Cited

U.S. PATENT DOCUMENTS 10,253,818 B1      4/2019   Ince et al.
2021/0115974 A1*   4/2021   Schamin ............... F16C 41/002
(Continued)

FOREIGN PATENT DOCUMENTS

DE         101 52 360 B4      2/2005
DE     10 2015 223 509 A1     3/2017
(Continued)

OTHER PUBLICATIONS

Office Action dated May 20, 2025, issued by Japanese Patent Office in Japanese Patent Application No. 2024-028494.
(Continued)

*Primary Examiner* — Phillip A Johnson
(74) *Attorney, Agent, or Firm* — Sughrue Mion, PLLC

(57)            ABSTRACT

An electrolytic corrosion prevention member for a rolling bearing, the electrolytic corrosion prevention member being mounted on a rolling bearing unit including the rolling bearing in which one bearing ring is a fixed ring and the other bearing ring is a rotating ring in order to prevent electrolytic corrosion of the rolling bearing, the electrolytic corrosion prevention member includes: a spring plate including an annular portion and a plurality of elastic portions that extend continuously from the annular portion in a radial shape and being formed of a thin plate of a conductive material; and a soft conductive member mounted on a surface of the elastic portion that faces the rotating ring. The soft conductive member is capable of abutting against a side surface of the rotating ring.

14 Claims, 8 Drawing Sheets

(56)          References Cited

U.S. PATENT DOCUMENTS

| 2021/0293279 A1 | 9/2021 | Hubert et al. |
| 2021/0364041 A1 | 11/2021 | Berruet et al. |
| 2023/0261553 A1 | 8/2023 | Viault |

FOREIGN PATENT DOCUMENTS

| DE | 102017106695 B3 * | 4/2018 | .......... F16C 33/7876 |
| JP | 4-8820 U | 1/1992 | |
| JP | 6-45121 U | 6/1994 | |
| JP | 2002-139065 A | 5/2002 | |
| JP | 2002-146568 A | 5/2002 | |
| JP | 2011-135720 A | 7/2011 | |
| JP | 2011-135722 A | 7/2011 | |
| JP | 2012-97856 A | 5/2012 | |
| JP | 2015-70751 A | 4/2015 | |
| JP | 2020-127257 A | 8/2020 | |
| JP | 2021-167663 A | 10/2021 | |
| JP | 2021-188746 A | 12/2021 | |
| JP | 2025-21505 A | 2/2025 | |
| WO | WO-2018233752 A1 * | 12/2018 | ............. H02K 11/40 |

OTHER PUBLICATIONS

Extended European Search Report dated Dec. 3, 2024, issued by the European Patent Office in European Application No. 24183257.5.
Office Action issued on Oct. 14, 2025 by the Japanese Patent Office in corresponding JP Patent Application No. 2024-028494.

* cited by examiner

ELECTROLYTIC CORROSION PREVENTION MEMBER FOR ROLLING BEARING AND ELECTROLYTIC CORROSION PREVENTION ROLLING BEARING UNIT

CROSS-REFERENCE TO RELATED APPLICATION(S)

This application is based upon and claims the benefit of priority from prior Japanese patent application No. 2024-028494 filed on Feb. 28, 2024, and prior Japanese patent application No. 2023-180999 filed on Oct. 20, 2023, the entire contents of which are incorporated herein by reference.

BACKGROUND

1. Field of the Invention

The present disclosure relates to an electrolytic corrosion prevention member for a rolling bearing that prevents electrolytic corrosion of a rolling bearing in a rolling bearing unit, and an electrolytic corrosion prevention rolling bearing unit provided with the electrolytic corrosion prevention member for a rolling bearing.

2. Description of the Related Art

In recent years, there has been a progress in practical use of an electric vehicle in which an electric motor serving as a drive source is provided inside or in the vicinity of the wheels to drive the wheels. Such a drive motor is generally called an in-wheel motor. The general in-wheel motor has a structure in which a stator is fixed to a motor housing and a rotor is provided on the inner diameter side of the stator with a gap in the radial direction, and is a so-called inner rotor type motor. As a drive method for the in-wheel motor, a brushless DC motor driven by an inverter is often used in consideration of the performance and the control performance of the motor.

In the method of driving with the inverter, a potential difference occurs between the stator and the rotor due to the parasitic capacitance between the stator and the rotor. This potential difference generates a so-called shaft voltage and shaft current, and when this shaft current passes through the rolling bearing that supports the rotor, a phenomenon called "electrolytic corrosion" occurs that damages the rolling bearing. Specifically, the current flows locally in the contact portion between the raceway surfaces of the outer ring and the inner ring of the rolling bearing and the rolling elements, and the raceway surface or the rolling surface is melted and becomes uneven. This not only roughens the rolling surface and the rolling element surface of the bearing, causing the noise and the vibration, but also affects the life of the bearing if excessive electrolytic corrosion occurs.

In order to prevent the electrolytic corrosion of the rolling bearing, a conductive member is sometimes used. For example, JP2011-135720A and JP2011-135722A propose a conductive member including a contact body that electrically conducts with the rotor of the motor, an elastic body that presses the contact body toward the rotor, and a storage portion that stores the contact body and the elastic body, in which the storage portion is provided in a motor housing and electrically connected to the motor stator via the motor housing.

JP2020-127257A proposes a grounding device in which the distal end portion of a broom-shaped conductive fiber is brought into contact with the outer peripheral surface of a rotating shaft.

Further, JP2002-146568A proposes an electrolytic corrosion prevention device in which an annular seat portion in contact with the end surface of a bearing outer ring is bent into a wave washer shape, an elastic conductor including a contact piece that is extended from the inner side of the annular seat portion and that is in contact with the vicinity of the end surface center portion of the rotating shaft is used, and the surface of the annular seat portion is pressed by the lid-shaped wall of a bearing housing and electrically conducted in the state in which the contact piece abuts against the vicinity of the end surface center portion of the rotating shaft fitted to the bearing inner ring, and in which the annular seat portion is overlapped with the end surface of the bearing outer ring fitted in the bearing housing.

Further, JPH04-8820U proposes that a rod-shaped conductive brush is accommodated in a support hole formed in either one of two bearing rings, the distal end of the conductive brush is biased toward the other bearing ring and is brought into sliding contact with the other bearing ring by the elastic member, and the two bearing rings are electrically conducted.

However, in the technique described above, the abrasion powder generated from the conductive member may contaminate the lubricating oil or the grease composition sealed for lubrication and may damage the raceway surface or the rolling surface. The mating member of the conductive member may be damaged and the abrasion powder may be generated.

Specifically, in JP2011-135720A and JP2011-135722A, the contact body, the elastic body, and the storage body are metal members, and are brought into sliding contact with one another due to the vibration of the motor, so that the metal powder is generated. It is necessary to provide the contact body, the elastic body, and the storage body in the motor housing, and a space therefor is also required.

In JP2020-127257A, the distal end portion of broom-shaped conductive fiber is brought into contact with the outer peripheral surface of the rotating shaft. However, in order to increase the contact area between the distal end portion of the broom-shaped conductive fiber and the rotating shaft as compared to when the distal end portion of the broom-shaped conductive fiber and the rotating shaft are simply brought into contact, the broom-shaped conductive fiber is brought into contact with the outer peripheral surface of the rotating shaft in the state of being bent. That is, since the distal end portion of the broom-shaped conductive fiber is in contact with the outer peripheral surface of the rotating shaft with a relatively strong pressing force, the abrasion powder is generated. At the same time, the outer peripheral surface of the rotating shaft, which is the mating member of the broom-shaped conductive fiber, is also damaged.

In JP2002-146568A, both the elastic conductor and the rotating shaft are made of metal, and the metal powder is generated when the elastic conductor and the rotating shaft come into sliding contact. At the same time, the end surface of the rotating shaft, which is the mating member of the elastic conductor, is damaged.

In JPH04-8820U, since the distal end of the rod-shaped conductive brush is in contact with the other bearing ring in the biased state, the abrasion powder of the conductive brush is generated. At the same time, the other bearing ring, which is the mating member of the conductive brush, is also damaged. Further, it is necessary to form a support hole for accommodating the conductive brush and the elastic member on the bearing ring, and a large load is applied to the bearing ring.

Therefore, the object of the present disclosure is to provide a space-saving and inexpensive electrolytic corrosion prevention member and an electrolytic corrosion prevention rolling bearing unit provided with the electrolytic corrosion prevention member. Accordingly, in addition to preventing the generation of the abrasion powder from a conductive member or the abrasion powder accompanying sliding contact between the conductive member and a mating member, and minimizing damage to the mating member, the electrolytic corrosion prevention member and the electrolytic corrosion prevention rolling bearing unit can be used with the existing bearing without requiring new processing on the bearing and without the restriction on the type of the bearing.

SUMMARY

The above object of the present disclosure is achieved by the following configuration.

According to an aspect of the present disclosure, there is provided an electrolytic corrosion prevention member for a rolling bearing, the electrolytic corrosion prevention member being mounted on a rolling bearing unit including the rolling bearing in which one bearing ring is a fixed ring and the other bearing ring is a rotating ring in order to prevent electrolytic corrosion of the rolling bearing, the electrolytic corrosion prevention member including: a spring plate including an annular portion and a plurality of elastic portions that extend continuously from the annular portion in a radial shape and being formed of a thin plate of a conductive material; and a soft conductive member mounted on a surface of the elastic portion that faces the rotating ring, in which the soft conductive member is capable of abutting against a side surface of the rotating ring.

A preferred embodiment of the present disclosure related to the electrolytic corrosion prevention member for a rolling bearing relates to the following configurations.

In the above aspect of the electrolytic corrosion prevention member for a rolling bearing, the annular portion may be pressed against a side surface of the fixed ring with a spacer interposed therebetween.

Further, in the above aspect of the electrolytic corrosion prevention member for a rolling bearing, the soft conductive member may be made of at least one selected from a resin-impregnated non-woven fabric, a non-woven fabric, a resin-impregnated woven fabric, a woven fabric, a resin-impregnated soft porous body, and a soft porous body.

Further, in the above aspect of the electrolytic corrosion prevention member for a rolling bearing, the plurality of elastic portions of the spring plate may be bent toward the rotating ring.

Further, in the above aspect of the electrolytic corrosion prevention member for a rolling bearing, the plurality of elastic portions of the spring plate may be flush with the annular portion.

The above object of the present disclosure is also achieved by the following configuration.

According to another aspect of the present disclosure, there is provided an electrolytic corrosion prevention member for a rolling bearing, the electrolytic corrosion prevention member being mounted on a rolling bearing unit including the rolling bearing in which one bearing ring is a fixed ring and the other bearing ring is a rotating ring in order to prevent electrolytic corrosion of the rolling bearing, the electrolytic corrosion prevention member including: a spring plate including an annular portion and a plurality of elastic portions that extend continuously from the annular portion in a radial shape and being formed of a thin plate of a conductive material; and a soft conductive member mounted on a surface of the elastic portion that faces a rotating member to which the rotating ring is fitted, in which the soft conductive member is capable of abutting against a side surface of the rotating member.

A preferred embodiment of the present disclosure related to the electrolytic corrosion prevention member for a rolling bearing relates to the following configurations.

In the above aspect of the electrolytic corrosion prevention member for a rolling bearing, the annular portion may be pressed against a side surface of the fixed ring with a spacer interposed therebetween.

Further, in the above aspect of the electrolytic corrosion prevention member for a rolling bearing, the soft conductive member is made of at least one selected from a resin-impregnated non-woven fabric, a non-woven fabric, a resin-impregnated woven fabric, a woven fabric, a resin-impregnated soft porous body, and a soft porous body.

Further, in the above aspect of the electrolytic corrosion prevention member for a rolling bearing, the plurality of elastic portions of the spring plate may be bent toward the rotating ring.

Further, in the above aspect of the electrolytic corrosion prevention member for a rolling bearing, the plurality of elastic portions of the spring plate may be flush with the annular portion.

The above object of the present disclosure is also achieved by the following configuration.

According to still another aspect of the present disclosure, there is provided an electrolytic corrosion prevention rolling bearing unit including: a rolling bearing in which one bearing ring is a fixed ring and the other bearing ring is a rotating ring; and the electrolytic corrosion prevention member for a rolling bearing according to the above aspects.

Hereinafter, the "electrolytic corrosion prevention member for a rolling bearing" is simply referred to as an "electrolytic corrosion prevention member", and the "electrolytic corrosion prevention rolling bearing unit" is simply referred to as a "bearing unit".

The electrolytic corrosion prevention member according to the present disclosure includes a soft conductive member mounted on an elastic portion of a spring plate and abutting against the side surface of a rotating ring or the side surface of a rotating member. The biasing force of the soft conductive member to the side surface of the rotating ring or the side surface of the rotating member by the spring plate is not fairly strong, and the abrasion powder is less likely to be generated. Moreover, since the soft conductive member is made of a soft material, damage to the rotating ring that is the mating member is also small.

The electrolytic corrosion prevention member and the electrolytic corrosion prevention rolling bearing unit can be used with the existing bearing without requiring any processing on the rolling bearing and without the restriction on the type of the rolling bearing, and thus the versatility is fairly high. Further, the spring plate is a thin plate, and an increase in space for the bearing unit to be mounted can be minimized.

The bearing unit according to the present disclosure is provided with the electrolytic corrosion prevention member according to the present disclosure. Therefore, generation of the abrasion powder and damage to the mating member are prevented, and further, the bearing unit is highly versatile and does not require an increase in space.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein:

FIGS. 1A to 1C show an example of an electrolytic corrosion prevention member according to a first embodiment of the present disclosure applied to an inner ring rotating type bearing unit, in which FIG. 1A is a plan view thereof, FIG. 1B is a cross-sectional view taken along a line A-A in FIG. 1A, and FIG. 1C is an enlarged view showing a bent portion between an annular portion and an elastic portion in FIG. 1B;

FIGS. 4A and 4B show an example of the electrolytic corrosion prevention member according to a second embodiment of the present disclosure applied to a bearing unit on the rotation side of the outer ring, in which FIG. 4A is a plan view thereof, and FIG. 4B is a cross-sectional view taken along a line A-A in FIG. 4A;

DETAILED DESCRIPTION OF THE INVENTION

Hereinafter, the embodiments of the present disclosure will be described in detail with reference to the drawings. The present disclosure is not limited to the embodiments to be described below, and can be implemented by being freely changed without departing from the gist of the present disclosure.

Figure 1A:
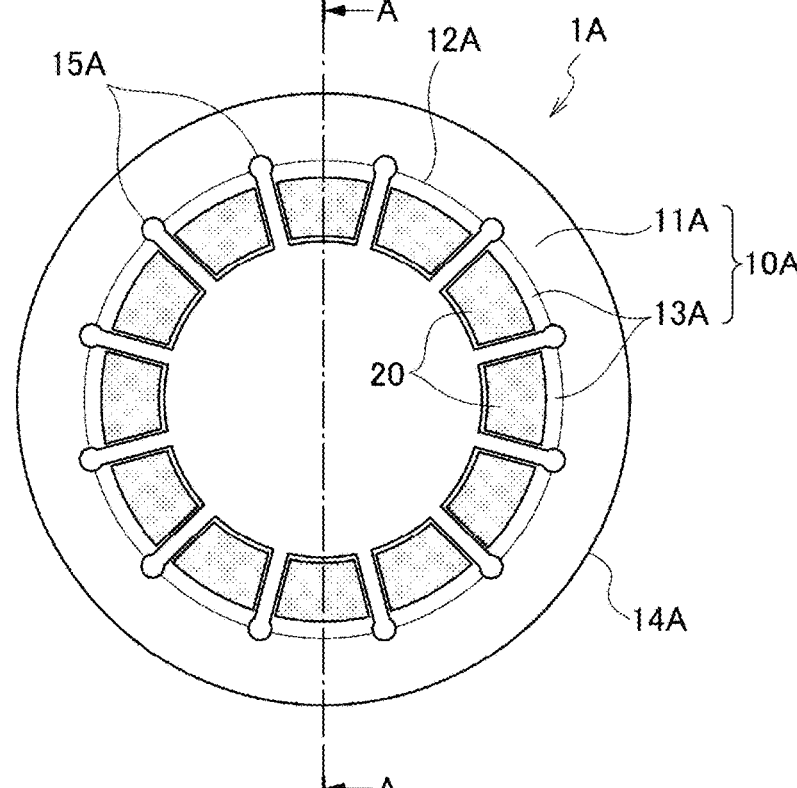
Figure 1B:
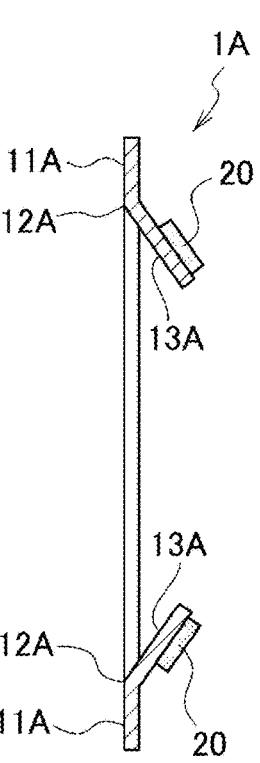
Figure 1C:
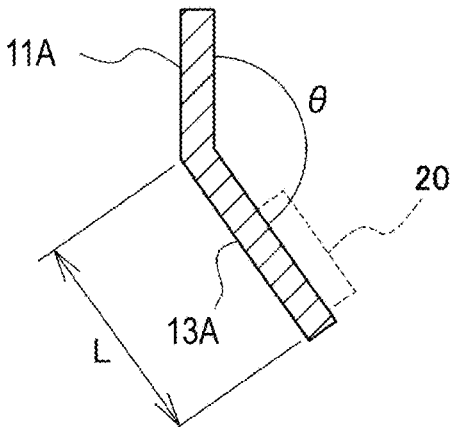
Figure 2:
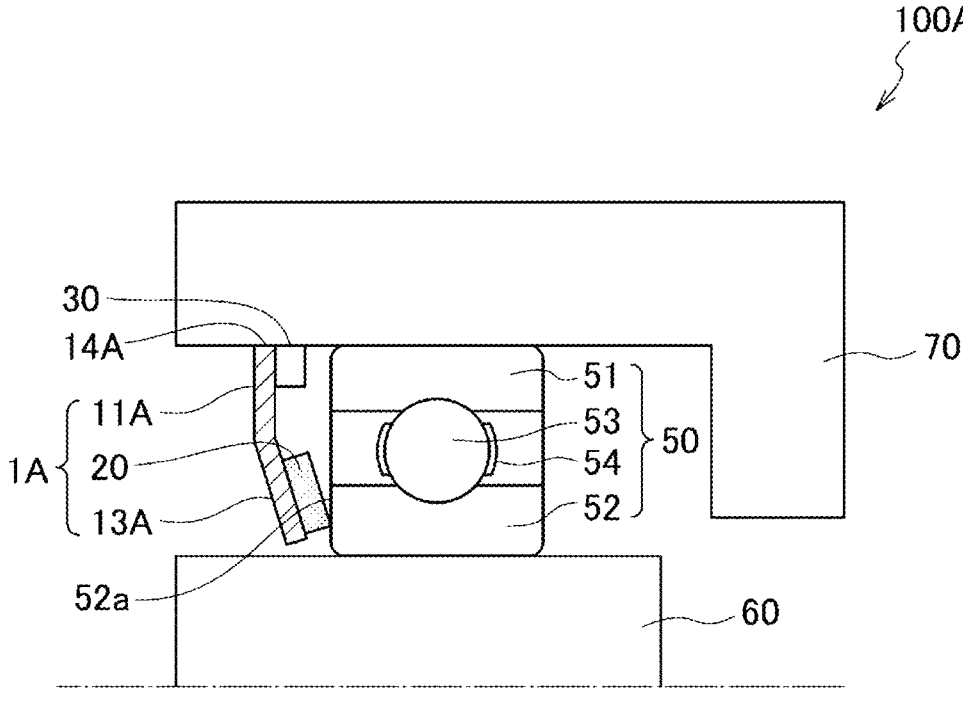
FIG. 2 is a cross-sectional view showing an example of the bearing unit provided with the electrolytic corrosion prevention member shown in FIGS. 1A to 1C.

First Embodiment: Electrolytic Corrosion Prevention Member and Bearing Unit for Inner Ring Rotation FIGS. 1A to 1C show an example of an electrolytic corrosion prevention member applied when a rotating ring is an inner ring, as an electrolytic corrosion prevention member according to the present disclosure. FIG. 1A is a plan view thereof, FIG. 1B is a cross-sectional view taken along a line A-A in FIG. 1A, and FIG. 1C is an enlarged view showing a bent portion between an annular portion and an elastic portion in FIG. 1B. FIG. 2 is a cross-sectional view showing an example of a bearing unit according to the present disclosure provided with the electrolytic corrosion prevention member shown in FIGS. 1A to 1C.

As shown in FIGS. 1A to 1C, an electrolytic corrosion prevention member 1A for inner ring rotation includes a spring plate 10A including an annular portion 11A and a plurality of elastic portions 13A that are bent at an inner diameter side end portion 12A of the annular portion 11A and that extend in a radial shape toward the center of the annular portion 11A. As shown in FIG. 2, when the elastic portion 13A is mounted on a bearing unit 100A, the elastic portion 13A is bent toward the right side in the figure in a manner of facing an inner ring 52 of a rolling bearing 50. Further, notches 15A are formed on both sides of the bent portion of the elastic portion 13A with the annular portion 11A to maintain the bent state of the elastic portion 13A.

The spring plate 10A is entirely made of a thin plate made of a conductive material such as metal. When the conductive material is metal, stainless steel is preferable because stainless steel is easy to process and is less prone to rust.

A soft conductive member 20 is mounted on the surface of each elastic portion 13A on the side facing the inner ring 52 of the rolling bearing 50, and the spring plate 10A and the soft conductive member 20 constitute the electrolytic corrosion prevention member 1A. The soft conductive member 20 is mounted on the elastic portion 13A using the adhesive.

The soft conductive member 20 is obtained by a soft base material being mixed with or supported on the conductive material. Examples of the soft base material include porous materials such as paper, cloth, and non-woven fabric, and resin sheets. Examples of the conductive material include metal fibers, pulverized materials, and powders of silver, copper, gold, aluminum, and stainless steel, and conductive carbon fibers, pulverized materials, and powders. As the soft conductive member, a commercially available product called a "conductive sheet" or the like can also be used. It is preferable that the soft conductive member is made of, among the materials, at least one selected from resin-impregnated non-woven fabrics, non-woven fabrics, resin-impregnated woven fabrics, woven fabrics, resin-impregnated soft porous bodies such as sponges, and soft porous bodies such as sponges.

As shown in FIG. 1C, when mounted on the bearing unit 100A, a bending angle $\theta$ between the annular portion 11A and the elastic portion 13A is appropriately set according to a length (L) of the elastic portion 13A and the size of the soft conductive member 20 such that the soft conductive member 20 abuts against a side surface 52a of the inner ring 52 of the rolling bearing 50. By the bending angle $\theta$, the biasing force of the soft conductive member 20 to the side surface 52a of the inner ring 52 of the rolling bearing 50 can be adjusted.

By decreasing the bending angle θ, the biasing force can be strengthened, and conversely, by increasing the bending angle θ, the biasing force can be weakened.

The planar shape of the soft conductive member 20 is not limited, and may be a rectangular shape in addition to the fan shape shown in FIG. 1A. A plurality of small pieces may be used.

As shown in FIG. 2, the electrolytic corrosion prevention member 1A shown in FIGS. 1A to 1C is mounted on the rolling bearing 50 to constitute the bearing unit 100A. However, there is no limit to the rolling bearing 50, and a plurality of rolling elements (balls) 53 are held between an outer ring 51 and an inner ring 52 in a manner of rolling freely by a retainer 54, and are lubricated with a lubricating oil or a grease composition. Here, the rotating ring is the inner ring 52, into which a shaft 60 directly connected to a motor (not shown) is fitted. The outer ring 51 is a fixed ring and is fixed to a housing 70.

Figure 3:
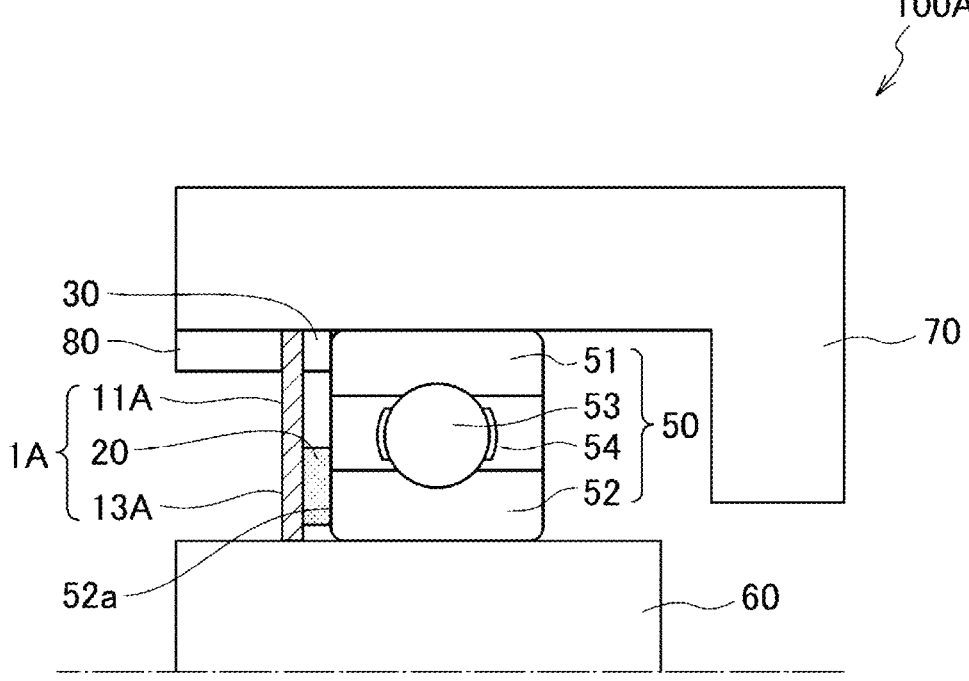
FIG. 3 is a view showing a state in which an electrolytic corrosion prevention member is pressed against an outer ring by a pressing member in FIG. 2.

In the present embodiment, as shown in FIG. 3, the annular portion 11A of the electrolytic corrosion prevention member 1A is pressed against the side surface of the outer ring 51 via a conductive spacer 30 by a conductive pressing member 80. The spacer 30 may have a thickness in consideration of the pressing amount of the spring plate 10A, the thickness of the soft conductive member 20, and the like. The annular portion 11A of the electrolytic corrosion prevention member 1A may directly abut against the side surface of the outer ring 51 without providing the spacer 30.

In such an inner ring rotating type bearing unit 100A, the current from the motor normally flows through the shaft 60 to the inner ring 52, and the rolling elements 53 and the outer ring 51 are energized inside the bearing, causing electrolytic corrosion in the rolling bearing 50. Therefore, in the present disclosure, the electrolytic corrosion prevention member 1A is mounted on the housing 70 such that the soft conductive member 20 abuts against the side surface 52a of the inner ring 52. The annular portion 11A of the spring plate 10A is in electrical contact with the side surface of the outer ring 51 via the conductive spacer 30, and is also in electrical contact with the conductive pressing member 80.

Accordingly, the current from the shaft 60 flows from the soft conductive member 20 to the elastic portion 13A and the annular portion 11A of the spring plate 10A through the inner ring 52, and flows to the housing 70 via an outer peripheral end surface 14A of the annular portion 11A, the pressing member 80, the spacer 30, and the outer ring 51. Therefore, no current is applied inside the bearing, and the rolling bearing 50 does not suffer from electrolytic corrosion.

Since the outer ring 51 has a large contact area with the housing 70, the current flowing through the outer ring 51 does not pass through the rolling element 53 and flows into the housing 70.

In the present embodiment, the outer peripheral end surface 14A of the annular portion 11A and the spacer 30 abut against the housing 70. Alternatively, the outer peripheral end surface 14A and the spacer 30 may be held between the outer ring 51 and the pressing member 80 without abutting against the housing 70. In this case, the current flowing through the annular portion 11A flows to the housing 70 via the outer ring 51 and the pressing member 80.

Further, the annular portion 11A of the electrolytic corrosion prevention member 1A may be directly pressed against the side surface of the outer ring 51 via the conductive spacer 30 without providing the pressing member 80, and may be fixed in a manner of abutting against the housing 70.

Since the side surface 52a of the inner ring 52 is in contact with the soft conductive member 20, the side surface 52a of the inner ring 52 is not damaged, and the rotation torque of the inner ring 52 can be prevented from decreasing.

Moreover, since the base material of the soft conductive member 20 is a porous body and has the oil absorption property and the oil retention property, oil is easily discharged between the adjacent spring plates 10A when the shaft rotates, and the oil film is less likely to form. Therefore, the conductivity is good even when the soft conductive member 20 is used in oil. By using the base material of the soft conductive member 20 as a porous body, the friction coefficient can be reduced even when the soft conductive member 20 is used in an environment other than the oil environment, and a reduction in the rotation torque of the inner ring 52 can be prevented.

Further, the spring plate 10A of the electrolytic corrosion prevention member 1A is a thin plate, and an increase in space of the bearing unit 100A can be minimized. Since there is no limitation on the rolling bearing 50 and there is no need to perform any processing, the rolling bearing 50 can be applied to the existing rolling bearing, and the versatility is fairly high.

By increasing the contact area between the soft conductive member 20 of the electrolytic corrosion prevention member 1A and the side surface 52a of the inner ring 52 of the rolling bearing 50, electrolytic corrosion of the rolling bearing 50 can be more effectively prevented. Since the spring plate 10A is entirely made of a bent thin plate and is an elastic member, by pressing the annular portion 11A of the electrolytic corrosion prevention member 1A toward the outer ring 51, the elastic force due to the pressing acts on the elastic portion 13A, the elastic portion 13A is pushed apart such that the bending angle θ shown in FIG. 1C becomes larger, and the entire elastic portion 13A moves toward the rolling bearing 50. Accordingly, the portion of the soft conductive member 20 that is away from the side surface 52a of the inner ring 52 in FIG. 2 also moves toward the rolling bearing 50, and almost the entire soft conductive member 20 comes into contact with the side surface 52a of the inner ring 52.

Figure 4A:
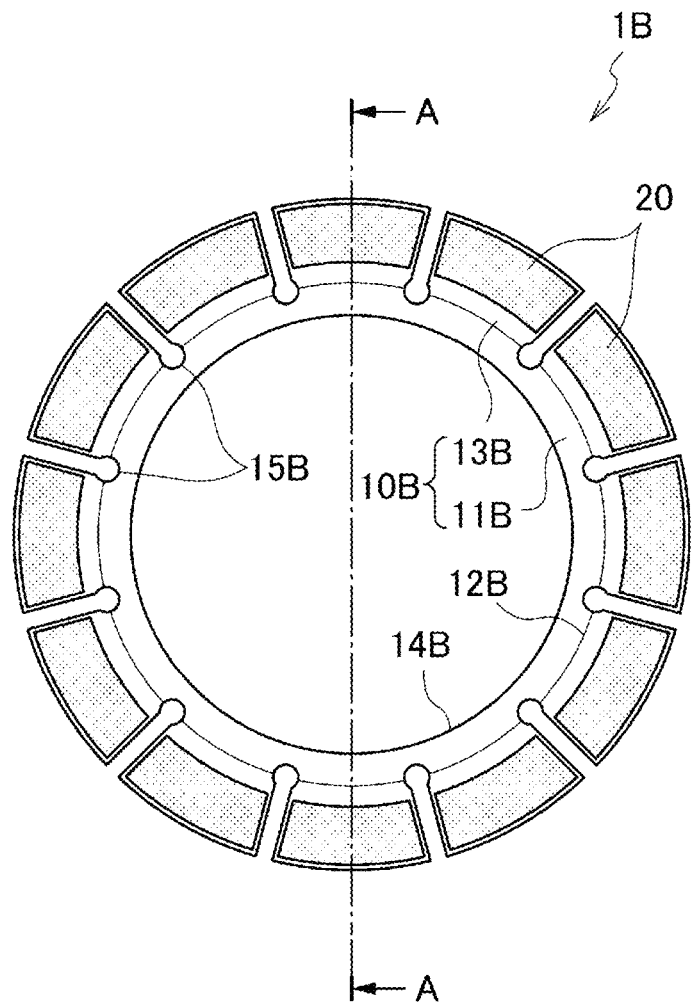
Figure 4B:
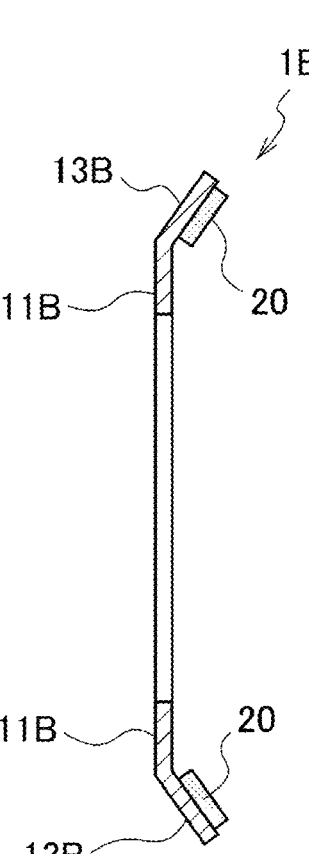
Figure 5:
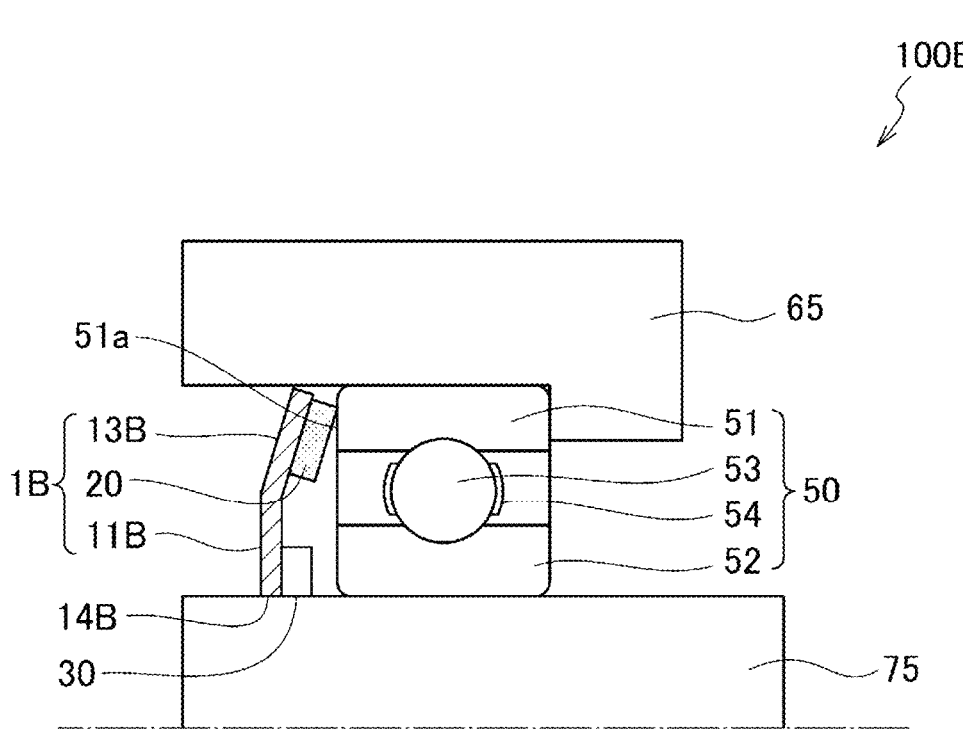
FIG. 5 is a cross-sectional view showing an example of the bearing unit provided with the electrolytic corrosion prevention member shown in FIGS. 4A and 4B.

Second Embodiment: Electrolytic Corrosion
Prevention Member and Bearing Unit for Outer
Ring Rotation The case has been described above in which the inner ring 52 of the rolling bearing 50 is a rotating ring. Alternatively, the outer ring 51 may also be a rotating ring. FIGS. 4A and 4B are views showing an electrolytic corrosion prevention member for outer ring rotation, in which FIG. 4A is a plan view thereof, and FIG. 4B is a cross-sectional view taken along a line A-A in FIG. 4A. FIG. 5 shows a bearing unit provided with the electrolytic corrosion prevention member shown in FIGS. 4A and 4B.

As shown in FIGS. 4A and 4B, an electrolytic corrosion prevention member 1B for outer ring rotation includes a spring plate 10B including an annular portion 11B and a plurality of elastic portions 13B that are bent at an outer diameter side end portion 12B of the annular portion 11B and that extend in a radial shape from the center of the annular portion 11B toward the outer periphery. As shown in FIG. 5, when the elastic portion 13B is mounted on a bearing unit 100B, the elastic portion 13B is bent toward the right side in the figure in a manner of facing the outer ring 51 of the rolling bearing 50. Arc-shaped notches 15B are formed on both sides of the bent portion of the elastic portion 13B with the annular portion 11B.

The soft conductive member 20 is mounted on the surface of each elastic portion 13B on the side facing the outer ring 51 of the rolling bearing 50, and the spring plate 10B and the soft conductive member 20 constitute the electrolytic corrosion prevention member 1B. The soft conductive member 20 is the same as the electrolytic corrosion prevention member 1A described above, and the description thereof is omitted.

The bearing unit 100B is provided with the electrolytic corrosion prevention member 1B. As shown in FIG. 5, in the rolling bearing 50, the inner ring 52 is fixed to a fixing member 75, and the outer ring 51 is provided with a rotating member 65. Therefore, the electrolytic corrosion prevention member 1B is mounted on the fixing member 75 such that the soft conductive member 20 abuts against the side surface 51a of the outer ring 51.

Although the current from a motor (not shown) that drives the rotating member 65 flows to the outer ring 51, the current flows from the soft conductive member 20 to the elastic portion 13B and the annular portion 11B of the spring plate 10B through the outer ring 51, and flows to the fixing member 75 via an inner peripheral end surface 14B of the annular portion 11B, the pressing member 80, the spacer 30, and the inner ring 52. Therefore, no current is applied inside the bearing, and the rolling bearing 50 does not suffer from electrolytic corrosion.

Figure 6:
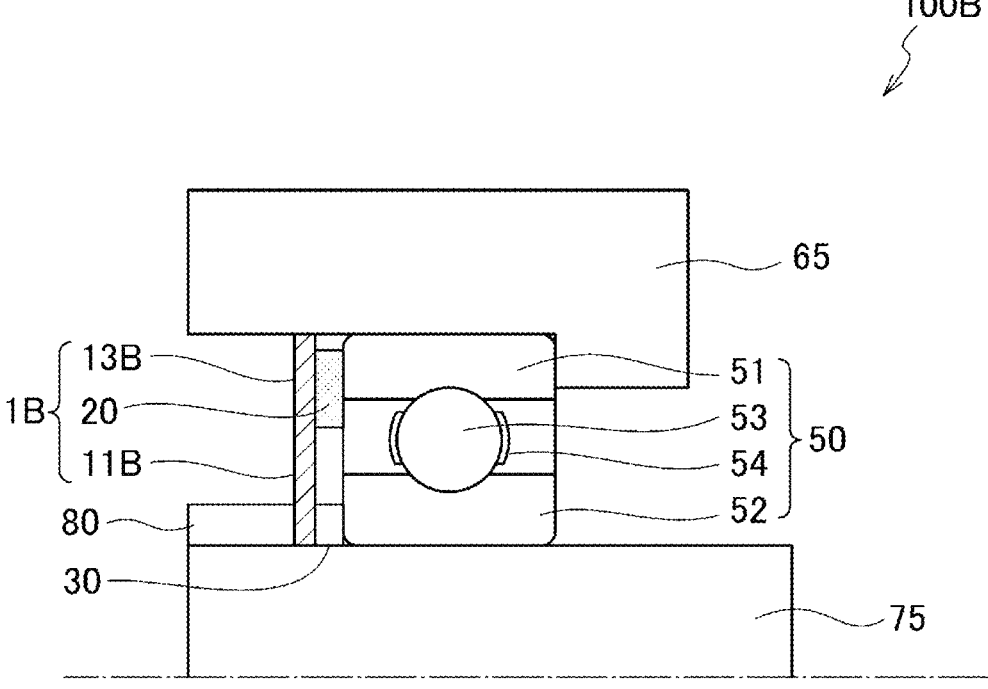
FIG. 6 is a view showing a state in which the electrolytic corrosion prevention member is pressed against an inner ring by a pressing member in FIG. 5.

As shown in FIG. 6, the electrolytic corrosion of the rolling bearing 50 can be more effectively prevented by pressing the annular portion 11B of the electrolytic corrosion prevention member 1B toward the inner ring 52 by the pressing member 80 and increasing the contact area between the soft conductive member 20 and the side surface 51a of the outer ring 51.

In the present embodiment, the annular portion 11B of the electrolytic corrosion prevention member 1B may also directly abut against the side surface of the inner ring 52 without providing the spacer 30.

The inner peripheral end surface 14B of the annular portion 11B and the spacer 30 may abut against the fixing member 75 or may be held between the inner ring 52 and the pressing member 80 without abutting against the fixing member 75.

Figure 7:
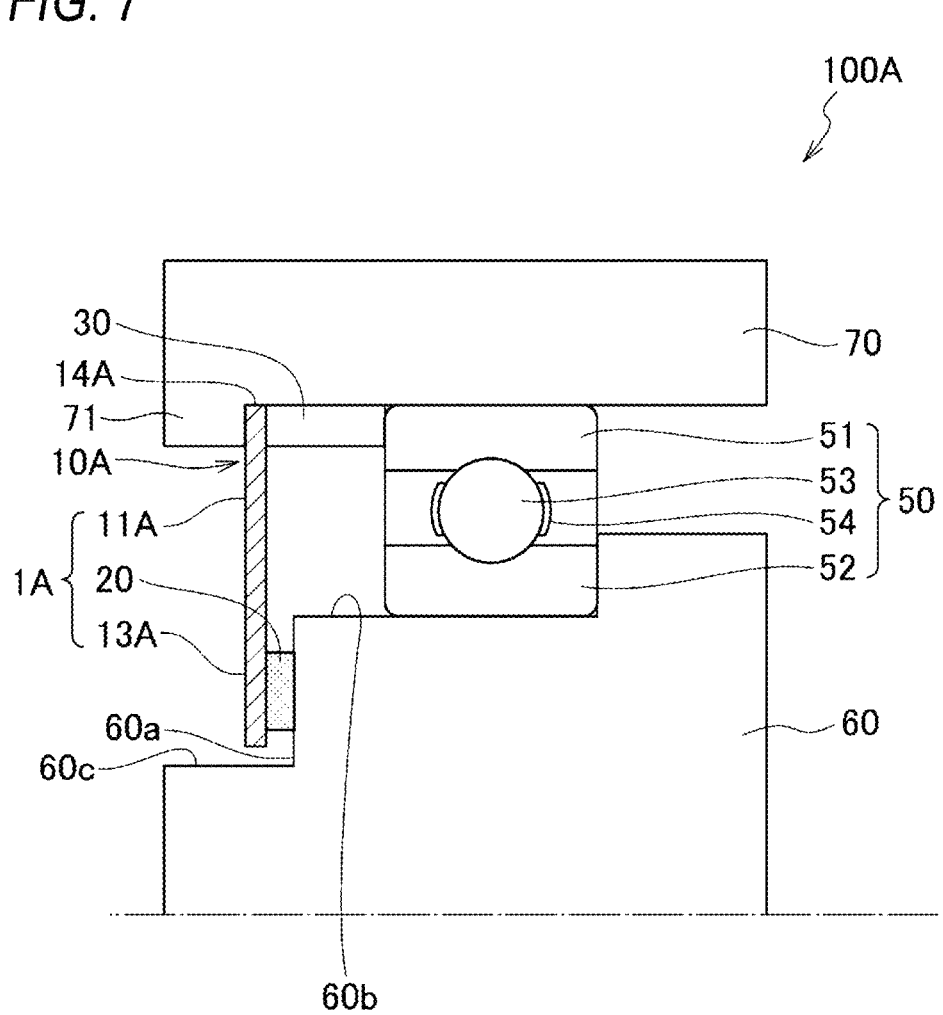
FIG. 7 is a cross-sectional view showing an example of an inner ring rotating type bearing unit provided with an electrolytic corrosion prevention member according to a third embodiment of the present disclosure.

Third Embodiment: Electrolytic Corrosion Prevention Member and Bearing Unit for Inner Ring Rotation FIG. 7 shows a case in which an electrolytic corrosion prevention member is mounted on a bearing unit whose rotating ring is an inner ring, similarly to the first embodiment. In this case, the shaft 60, which is a rotating member to which the inner ring 52 is fitted, is formed with a stepped surface 60c having a smaller diameter than a fitting surface 60b to which the inner ring 52 is fitted.

The soft conductive member 20 of the spring plate 10A is mounted on the surface of the elastic portion 13A facing the shaft 60 in the axial direction, specifically, on a side surface 60a between the fitting surface 60b to which the inner ring 52 is fitted and the stepped surface 60c, by elastically deforming the elastic portion 13A. Therefore, the soft conductive member 20 can abut against the side surface 60a of the shaft 60.

In such an inner ring rotating type bearing unit 100A, the soft conductive member 20 of the electrolytic corrosion prevention member 1A is mounted on the housing 70 in a manner of abutting against the side surface 60a of the shaft 60. The annular portion 11A of the spring plate 10A is in electrical contact with the side surface of the outer ring 51 via the conductive spacer 30, and is also in electrical contact with the end surface of a flange portion 71 of the housing 70.

Accordingly, the current from the shaft 60 flows from the soft conductive member 20 to the elastic portion 13A and the annular portion 11A of the spring plate 10A through the side surface 60a of the shaft 60, and flows to the housing 70 via an outer peripheral end surface 14A of the annular portion 11A, the spacer 30, and the outer ring 51 or flows directly to the housing 70. Therefore, no current is applied inside the bearing, and the rolling bearing 50 does not suffer from electrolytic corrosion.

In the present embodiment, unlike the first embodiment, the electrolytic corrosion prevention member 1A is not in contact with the side surface 52a of the inner ring 52. Therefore, the design freedom of the rolling bearing, such as the attachment of the snap ring, can be improved. In the present embodiment, since the electrolytic corrosion prevention member and the rolling bearing are separated from each other in terms of position, the lubrication environments thereof can be separately controlled. For example, it is possible to place only the electrolytic corrosion prevention member in the dry environment, or to increase or decrease the amount of oil lubrication between the electrolytic corrosion prevention member and the rolling bearing.

In particular, in the bearing unit 100A shown in FIG. 7, the position where the soft conductive member 20 is in contact with the side surface 60a of the shaft 60 has a smaller diameter than the position where the soft conductive member 20 is in contact with the side surface 52a of the inner ring 52 as shown in FIG. 1. Therefore, the circumferential speed of the side surface 60a of the shaft 60 can be reduced, and the generation of the abrasion powder and drag loss can be further reduced.

Figure 8:
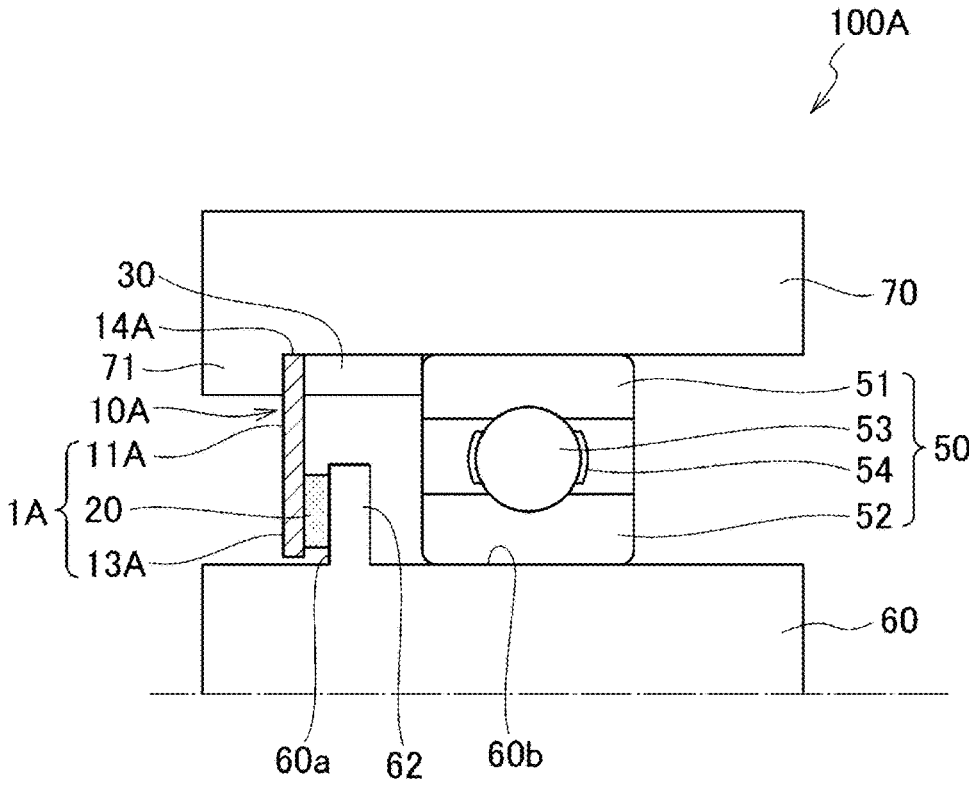
FIG. 8 is a cross-sectional view showing an example of an inner ring rotating type bearing unit provided with another electrolytic corrosion prevention member according to the third embodiment of the present disclosure.

As shown in FIG. 8, in the present embodiment, the shaft 60 may be provided with a flange portion 62 that protrudes from the fitting surface 60b toward the outer diameter side, and the soft conductive member 20 may abut against the side surface 60a of the flange portion 62.

Figure 9:
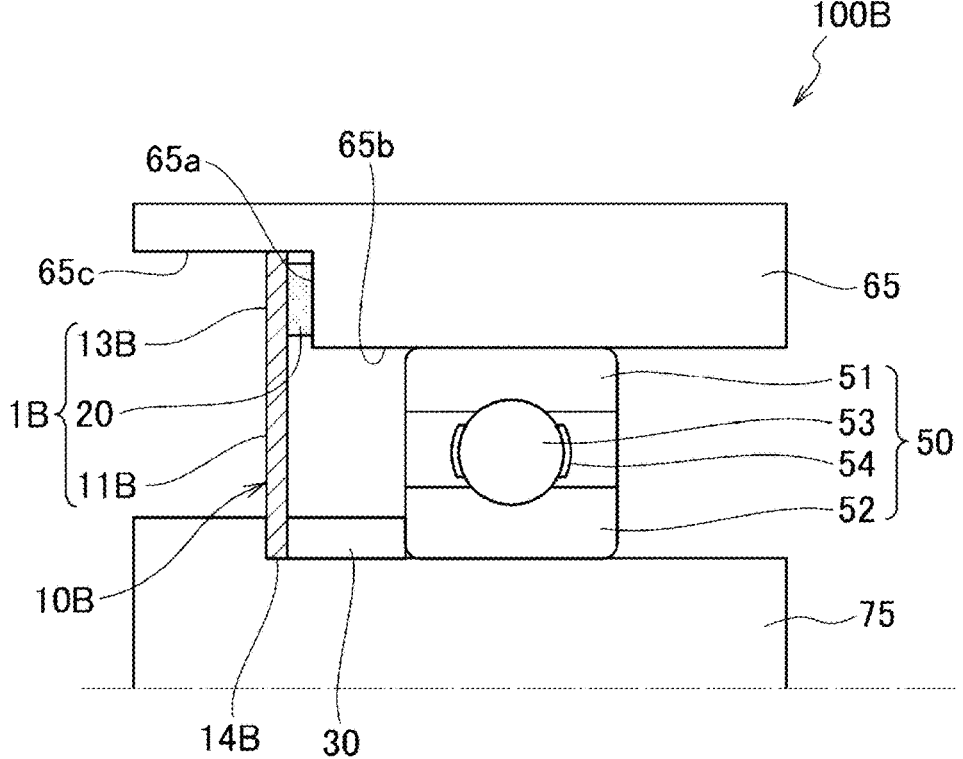
FIG. 9 is a cross-sectional view showing an example of an outer ring rotating type bearing unit provided with an electrolytic corrosion prevention member according to a fourth embodiment of the present disclosure.

Fourth Embodiment: Electrolytic Corrosion Prevention Member and Bearing Unit for Outer Ring Rotation FIG. 9 shows a case in which an electrolytic corrosion prevention member is mounted on a bearing unit whose rotating ring is an outer ring, similarly to the second embodiment. In this case, the rotating member 65 to which the outer ring 51 is fitted has a stepped surface 65c having a larger diameter than a fitting surface 65b to which the outer ring 51 is fitted.

The soft conductive member 20 of the spring plate 10B is mounted on the surface of the elastic portion 13B facing the rotating member 65 in the axial direction, specifically, on a side surface 65a between the fitting surface 65b to which the outer ring 51 is fitted and the stepped surface 65c, by elastically deforming the elastic portion 13B. Therefore, the soft conductive member 20 can abut against the side surface 65a of the rotating member 65.

In such an outer ring rotating type bearing unit 100B, the soft conductive member 20 of the electrolytic corrosion prevention member 1B is mounted on the rotating member 65 in a manner of being abutting against the side surface 65a of the rotating member 65. The annular portion 11B of the spring plate 10B is in electrical contact with the side surface of the inner ring 52 via the conductive spacer 30, and is also in electrical contact with the end surface of a flange portion 76 of the fixing member 75.

Accordingly, the current from the motor (not shown) that drives the rotating member 65 flows from the soft conductive member 20 to the elastic portion 13B and the annular portion 11B of the spring plate 10B through the side surface 65a of the rotating member 65, and flows to the fixing member 75 via the inner peripheral end surface 14B of the annular portion 11B, the spacer 30, and the inner ring 52 or flows directly to the fixing member 75. Therefore, no current is applied inside the bearing, and the rolling bearing 50 does not suffer from electrolytic corrosion.

In the present embodiment, unlike the second embodiment, the electrolytic corrosion prevention member 1B is not in contact with the side surface 51a of the outer ring 51. Therefore, the design freedom of the rolling bearing, such as the attachment of the snap ring, can be improved. In the present embodiment, since the electrolytic corrosion prevention member and the rolling bearing are separated from each other in terms of position, the lubrication environments thereof can be separately controlled. For example, it is possible to place only the electrolytic corrosion prevention member in the dry environment, or to increase or decrease the amount of oil lubrication between the electrolytic corrosion prevention member and the rolling bearing.

Figure 10:
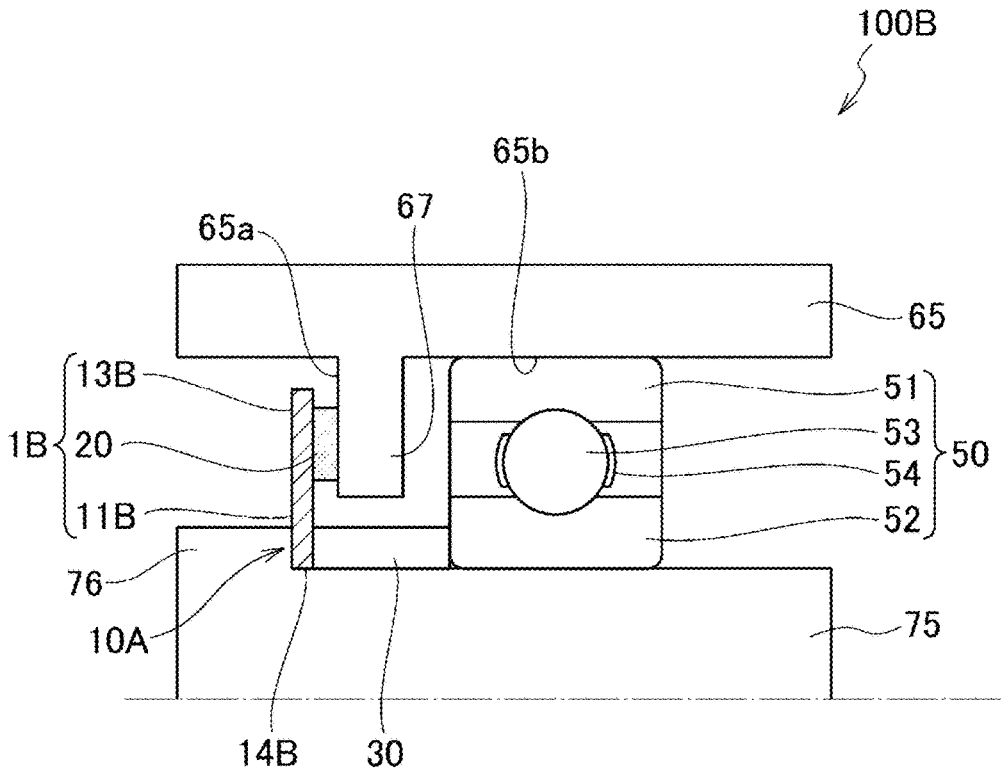
FIG. 10 is a cross-sectional view showing an example of an outer ring rotating type bearing unit provided with another electrolytic corrosion prevention member according to the fourth embodiment of the present disclosure.

As shown in FIG. 10, in the present embodiment, the rotating member 65 may be provided with a flange portion 67 that protrudes from the fitting surface 65b toward the inner diameter side, and the soft conductive member 20 may abut against the side surface 65a of the flange portion 67.

In particular, in the bearing unit 100B shown in FIG. 10, the position where the soft conductive member 20 is in contact with the side surface 65a of the rotating member 65 has a smaller diameter than the position where the soft conductive member 20 is in contact with the side surface 51a of the outer ring 51 as shown in FIG. 6. Therefore, the circumferential speed of the side surface 65a of the rotating member 65 can be reduced, and the generation of the abrasion powder and drag loss can be further reduced.

The present disclosure is not limited to the above embodiment, and may be modified and improved as appropriate.

Figure 11:
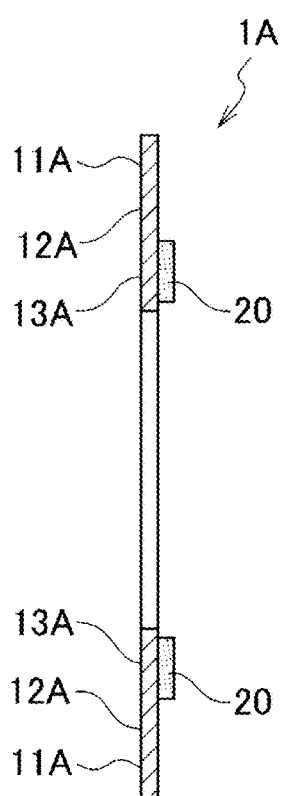
FIG. 11 is a cross-sectional view corresponding to FIG. 1B and showing an electrolytic corrosion prevention member according to a modification of the present disclosure.

For example, in the above embodiment, the plurality of elastic portions 13A and 13B of the spring plates 10A and 10B are bent toward the rotating ring. Alternatively, the plurality of elastic portions 13A and 13B may also be formed flush with the annular portions 11A and 11B without being bent at the inner diameter side end portion 12A and the outer diameter side end portion 12B. As shown in FIG. 11, for example, in the case of the electrolytic corrosion prevention member 1A for inner ring rotation, the annular portion 11A and the elastic portion 13A are linearly continuous in the side view.

Figure 12:
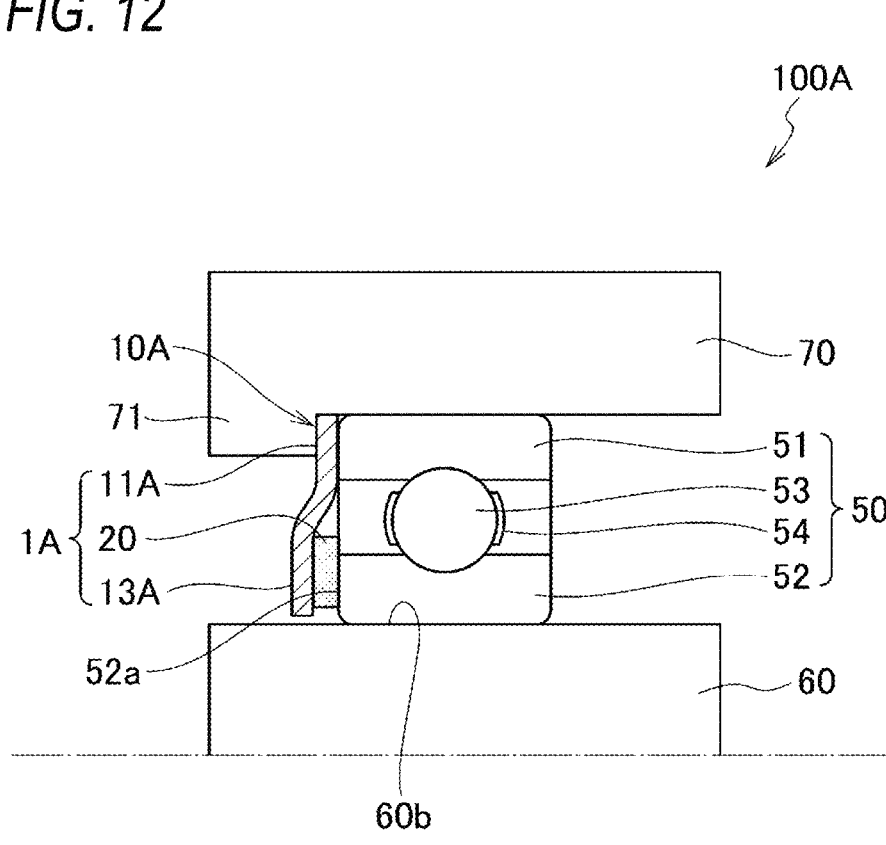
FIG. 12 is a cross-sectional view showing an example of a bearing unit provided with the electrolytic corrosion prevention member shown in FIG. 11.

Therefore, in the bearing unit 100A shown in FIG. 12, when the annular portion 11A of the electrolytic corrosion prevention member 1A is held between the flange portion 71 of the housing 70 and the side surface of the outer ring 51, the elastic portion 13A of the electrolytic corrosion prevention member 1A is elastically deformed by an amount equal to the thickness of the soft conductive member 20, and the soft conductive member 20 abuts against the side surface of the inner ring 52 by the bending reaction force of the spring plate 10A. Accordingly, the same function as that of the above embodiment can be achieved.

In this case, since bending of the spring plate 10A is not required, the electrolytic corrosion prevention member 1A can be manufactured at low cost, and the spring plate 10A and the soft conductive member 20 can be bonded together easily.

In the present embodiment, the spring plate includes a plurality of elastic portions extending in a radial shape toward the center of the annular portion. Alternatively, the spring plate may include one elastic portion extending toward the center of the annular portion.

The invention claimed is:

1. An electrolytic corrosion prevention member for a rolling bearing, the electrolytic corrosion prevention member being mounted on a rolling bearing unit including the rolling bearing in which one bearing ring is a fixed ring and the other bearing ring is a rotating ring in order to prevent electrolytic corrosion of the rolling bearing, the electrolytic corrosion prevention member comprising:
   a spring plate including an annular portion and a plurality of elastic portions that extend continuously from the annular portion in a radial shape and being formed of a thin plate of a conductive material; and
   a soft conductive member mounted on a surface of the elastic portion that faces the rotating ring,
   wherein the soft conductive member is capable of abutting against a side surface of the rotating ring.

2. The electrolytic corrosion prevention member for the rolling bearing according to claim 1,
   wherein the annular portion is pressed against a side surface of the fixed ring with a spacer interposed therebetween.

3. The electrolytic corrosion prevention member for the rolling bearing according to claim 2,
   wherein the soft conductive member is made of at least one selected from a resin-impregnated non-woven fabric, a non-woven fabric, a resin-impregnated woven fabric, a woven fabric, a resin-impregnated soft porous body, and a soft porous body.

4. The electrolytic corrosion prevention member for the rolling bearing according to claim 1,
   wherein the soft conductive member is made of at least one selected from a resin-impregnated non-woven fabric, a non-woven fabric, a resin-impregnated woven fabric, a woven fabric, a resin-impregnated soft porous body, and a soft porous body.

5. The electrolytic corrosion prevention member for the rolling bearing according to claim 1,
   wherein the plurality of elastic portions of the spring plate are bent toward the rotating ring.

6. The electrolytic corrosion prevention member for the rolling bearing according to claim 1,
   wherein the plurality of elastic portions of the spring plate are flush with the annular portion.

7. An electrolytic corrosion prevention rolling bearing unit comprising:
   a rolling bearing in which the one bearing ring is the fixed ring and the other bearing ring is the rotating ring; and
   the electrolytic corrosion prevention member for the rolling bearing according to claim 1.

8. An electrolytic corrosion prevention member for a rolling bearing, the electrolytic corrosion prevention member being mounted on a rolling bearing unit including the rolling bearing in which one bearing ring is a fixed ring and the other bearing ring is a rotating ring in order to prevent electrolytic corrosion of the rolling bearing, the electrolytic corrosion prevention member comprising:
   a spring plate including an annular portion and a plurality of elastic portions that extend continuously from the annular portion in a radial shape and being formed of a plate of a conductive material; and a soft conductive member mounted on a surface of the elastic portion that faces a rotating member to which the rotating ring is fitted, wherein the soft conductive member is capable of abutting against a side surface of the rotating member.

9. The electrolytic corrosion prevention member for the rolling bearing according to claim 8, wherein the annular portion is pressed against a side surface of the fixed ring with a spacer interposed therebetween.

10. The electrolytic corrosion prevention member for the rolling bearing according to claim 9, wherein the soft conductive member is made of at least one selected from a resin-impregnated non-woven fabric, a non-woven fabric, a resin-impregnated woven fabric, a woven fabric, a resin-impregnated soft porous body, and a soft porous body.

11. The electrolytic corrosion prevention member for the rolling bearing according to claim 8, wherein the soft conductive member is made of at least one selected from a resin-impregnated non-woven fabric, a non-woven fabric, a resin-impregnated woven fabric, a woven fabric, a resin-impregnated soft porous body, and a soft porous body.

12. The electrolytic corrosion prevention member for the rolling bearing according to claim 8, wherein the plurality of elastic portions of the spring plate are bent toward the rotating ring.

13. The electrolytic corrosion prevention member for the rolling bearing according to claim 8, wherein the plurality of elastic portions of the spring plate are flush with the annular portion.

14. An electrolytic corrosion prevention rolling bearing unit comprising:

a rolling bearing in which the one bearing ring is the fixed ring and the other bearing ring is the rotating ring; and the electrolytic corrosion prevention member for the rolling bearing according to claim 8.

\* \* \* \* \*